(12) United States Patent
Viggiano et al.

(10) Patent No.: US 7,448,925 B2
(45) Date of Patent: Nov. 11, 2008

(54) SAFETY SHUT-OFF DEVICE FOR VEHICLE HAVING A ROTARY ON-OFF SWITCH

(75) Inventors: Anthony G. Viggiano, Groton, CT (US); Martin J. LoSchiavo, Rocky Hill, CT (US)

(73) Assignee: Autotether, Inc

( * ) Notice: Subject to any disclaimer, the term of this patent is extended or adjusted under 35 U.S.C. 154(b) by 20 days.

(21) Appl. No.: 11/786,211

(22) Filed: Apr. 10, 2007

(65) Prior Publication Data

US 2007/0254538 A1    Nov. 1, 2007

Related U.S. Application Data

(63) Continuation-in-part of application No. 11/290,727, filed on Nov. 30, 2005, now Pat. No. 7,201,619.

(60) Provisional application No. 60/851,678, filed on Oct. 13, 2006.

(51) Int. Cl.
*B63H 21/22* (2006.01)
(52) U.S. Cl. .................. 440/1; 440/84; 180/272
(58) Field of Classification Search .............. 440/1, 440/84, 85; 340/539.21, 539.23; 180/272
See application file for complete search history.

(56) References Cited

U.S. PATENT DOCUMENTS

| | | | |
|---|---|---|---|
| 4,305,143 A | 12/1981 | Sims | |
| 4,714,914 A | 12/1987 | Boe | |
| 5,021,765 A | 6/1991 | Morgan | |
| 5,349,329 A | 9/1994 | Smith | |
| 5,838,227 A | 11/1998 | Murray | |
| 5,945,912 A | 8/1999 | Guildbrand | |
| 6,157,303 A | 12/2000 | Bodie et al. | |
| 6,352,045 B1 | 3/2002 | Takashima | |
| 7,083,482 B2 * | 8/2006 | Bouge et al. | 440/1 |
| 7,119,694 B2 | 10/2006 | Ehlers | |
| 7,201,619 B1 * | 4/2007 | Viggiano et al. | 440/1 |
| 2004/0156327 A1 | 8/2004 | Yankielvn | |

\* cited by examiner

*Primary Examiner*—Lars A Olson
(74) *Attorney, Agent, or Firm*—C. Nessler

(57) ABSTRACT

A safety system, which stops the motion of a boat or other craft when a person falls off the craft, is comprised of a wireless transmitter carried by the person, a receiver-controller, an actuator, and a rotary on-off switch, such as a common ignition switch. When the person falls off and moves away, the diminution in wireless signal causes the electromechanical actuator, attached to the control panel, to rotate the key which is in the ignition switch. A linear actuator either pushes or pulls on the grip portion of the key, with or without the use of an end cap which receives the key grip portion, for better connection or mechanical advantage. The actuator stores manually input energy, to enable the use of a compact and low power solenoid type coil.

18 Claims, 9 Drawing Sheets

SAFETY SHUT-OFF DEVICE FOR VEHICLE HAVING A ROTARY ON-OFF SWITCH

This application is a continuation in part of patent application Ser. No. 11/290,727, filed Nov. 30, 2005, now U.S. Pat. No. 7,201,619 of A. Viggiano and M. LoSchiavo. This application claims benefit of provisional application No. 60/851,678, filed Oct. 13, 2006.

TECHNICAL FIELD

The present invention relates to remotely activated safety devices, useful with boats, motor vehicles and other machines, for stopping operation of the power source of a vehicle, in particular the engine, when the operator or other person falls off.

BACKGROUND

The present invention includes improvements on the safety device invention which is disclosed in patent application Ser. No. 11/290,727 "Safety Shut Off System for a Powered Vehicle", filed Nov. 30, 2005 by A. Viggiano and M. LoSchiavo.

In a nutshell, a principal embodiment of an invention described in the aforesaid Ser. No. 11/290,727 application comprises an electromechanical actuator which removes a U-shape latch from a spring activated type ignition switch, to kill the engine. The preferred actuator is a linear actuator. It moves in response to a signal or cessation of a signal from an electromagnetic transmitter carried by a boat occupant. When the occupant falls off the boat, the signal received at the boat changes, and by means of the control system, the actuator is commanded to remove the latch key from the switch with some sort of linear motion. When the latch key is removed, the the kill switch plunger to move under force of an internal spring, and into its shut-off mode, thus stopping the boat. This compares with the prevalent older system, where a lanyard running to the operator or a boat or other vehicle pulls the latch from the key when the operator moves too far from the switch, e.g., when he falls overboard. The invention can be used on other vehicles.

Embodiments of the present invention have the same general objects and uses as the invention of the patent application Ser. No. 10/290,727 invention. It is intended for use on a craft or vehicle which has an ignition switch, also sometimes called a power switch, which may or may not be a kill type switch, and to turn the switch off by rotating the switch to a position where it stops the vehicle.

SUMMARY

An object of the invention is to provide an improved way of killing the engine of an engine powered vehicle, in particular a watercraft, when the operator or another occupant falls overboard or otherwise moves away. Another object is to provide a wireless man-overboard system which is simple and economic to construct and install, particularly to provide one whcih does not require intervention into the wiring of the control system of the vehicle. A still further object is cause rotation of a rotary ignition switch of an engine, so that the switch may be moved from a run position to a stop position.

In accord with the invention, an embodiment which is useful with a vehicle which has a rotatable switch for stopping the engine may employ many of the same elements of the system as are used with a kill switch, which is summarized just below. Reference should be had to same for appreciation of the variations of this the switch-rotating embodiment, which is summarized in this paragraph. When a person falls off the vehicle, the person carries a means for wirelessly sending a signal to a receiver on the vehicle. When the signal strength changes, a command is sent to actuate a means for engaging and rotating the grip portion of the key, which is inserted in the ignition or power switch. The rotation is sufficient to turn the engine off. In one embodiment of this aspect of the invention, the means for engaging and rotating comprises an actuator having a linear motion plunger. The actuator either pushes or pulls on the grip portion of the key, with or without the use of an end cap which receives the key grip portion, for better connection or mechanical advantage. The line of force applied to the grip portion by linear actuator is transverse to and laterally offset from the axis of rotation of the key. In another embodiment, the means for engaging and rotating comprises a removable rotary actuator which is co-aligned with the axis of rotation of said key.

In further accord with the invention, the engine of a motorized water craft is stopped when a person falls off the craft by means of an actuator, which acts in response to pre-determined diminution of a wireless signal from a transmitter carried by the person, causes the power source to decrease its propulsive effect. In the case of a motor boat, the actuator removes the latch key from a kill switch configured along the lines of kill switches used in the prior art with lanyards. In the case of a sail boat, the actuator disconnects a sheet from the sail of the boat or disconnects some other sheet in a way which affects the propulsive power or the direction of the boat.

In one embodiment, actuator is fastened to the latch key to thereby form a hold-release assembly which is engaged with the switch body. The actuator has a movable element, e.g., a rod, for pushing against the kill switch body, to push the assembly from the body and thus withdraw the latch key from the kill switch, thereby shutting off the craft engine. In another embodiment, the actuator pulls on a tether connected to a fixed point, to pull the latch key and actuator assembly from the kill switch. In another embodiment, an actuator is fixedly mounted near the switch and is connected to the latch key by a tether, to thereby form the hold-release assembly; and the actuator has a movable element which pulls on the tether.

In a preferred embodiment, a portable transmitter is carried by the operator or other person on the water craft and continuously sends a wireless signal to a receiver mounted on the watercraft. The latch key of a hold-release assembly holds a spring actuated plunger of the kill switch in a position which enables the engine to run. When the wireless signal diminishes below a predetermined threshold, as when the person falls overboard and separates, the receiver signals a controller that activates an electric coil of an actuator. The coil moves internal parts of the actuator, and spring loaded components which move a push or pull rod or other movable element, which results in sliding removal of the latch key from the kill switch. The engine and motion of the craft is stopped, presumably enabling the overboard person to swim back to the craft.

Further, in the preferred embodiment, after a use in which the engine is stopped, the actuator is reset for another use by manually pushing on the actuator rod, to re-store mechanical energy in the actuator, and the latch key is re-engaged with the switch. The use of the manually input energy provides the substantial force needed to remove the latch from the switch, and lessens the amount of electric power which is required, along with enabling a small actuator. In other embodiments, the actuator may use only electric energy, like a common solenoid, or may use compressed gas. The transmitter has self-contained battery power supply and the receiver, controller and actuator may be powered from batteries or the water craft electrical system. More than one transmitter carried by more than one person may be used in the invention.

With motor boats, the invention permits an operator or other person to move about freely within the confines of the motor boat, compared to a system which uses a lanyard running to the person from the switch. The invention permits the installation of a wireless signaling system on an engine powered craft which has pre-existing lanyard type kill switch, without need of a skilled tradesman or intervention into the electrical system of the craft. With sail boats, the installation is likewise adaptable to different configurations of boats and may be retrofitted without high cost. The invention is also useful with other craft and in other applications which present similar problems.

DESCRIPTION

The invention is described in terms of a boat, but will be understood to be useful to other water craft, for instance so-called personal water craft or jet-skis, engine-powered sailboats, and the like, for which it is appropriate to stop motion when an operator or other person falls overboard. The invention will also be useful for other motorized craft which have engines, including such as snowmobiles, ATV's and other wheeled vehicles.

The invention is first described in terms of a boat having a kill switch which has a latch key. It is then described, in connection with FIG. 13-15, with respect to a craft having a rotary switch, where the engine is stopped by rotation of the switch. Most kill switches are also rotary switches, and thus, the present invention may be used with them as an alternative to the system which removes the latch key of the kill switch from the switch.

Figure 1:
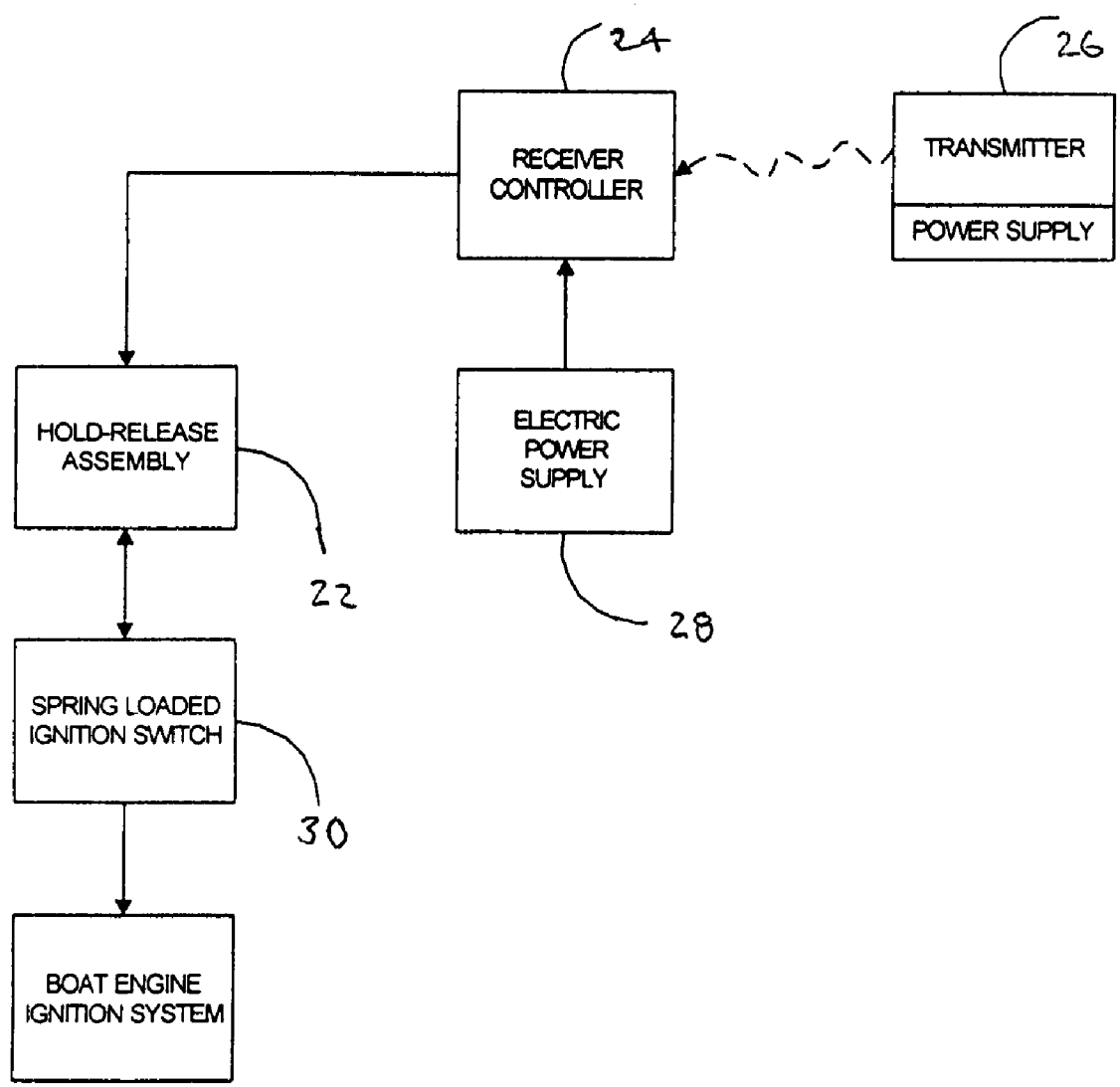
FIG. 1 is a diagram showing the major components an embodiment of the invention system.

In comprehensive form, the invention system is comprised of several essential components, the relationship of which is shown in block form in FIG. 1. Transmitter 26, having a self-contained battery power supply is carried by the operator or other person on a boat. It is in wireless radio communication with a receiver-controller 24, that has its own power supply 28, which may be that of the boat. The receiver-controller is in electromagnetic communication with the hold-release assembly (HRA) 60, as by wires or radio or light waves. The HRA 60 is physically connected to the boat kill switch, which has a built-in spring loaded "kill" mechanism. Such type of kill switch is well known commercially, for use with internal combustion engines on boats. See Taskahsima U.S. Pat. No. 6,352,045, the disclosure of which is hereby incorporated by reference. The type of kill switch used with the invention has a movable part which must be continuously held against a spring bias in order to sustain current flow in the engine ignition circuit and to keep the engine running. The kill switch 30 used in describing the best mode of the invention here has a central plunger which must be pushed down. The primarily mechanical aspects of the invention are first described. Then the functioning of the control circuit is described.

Figure 2:
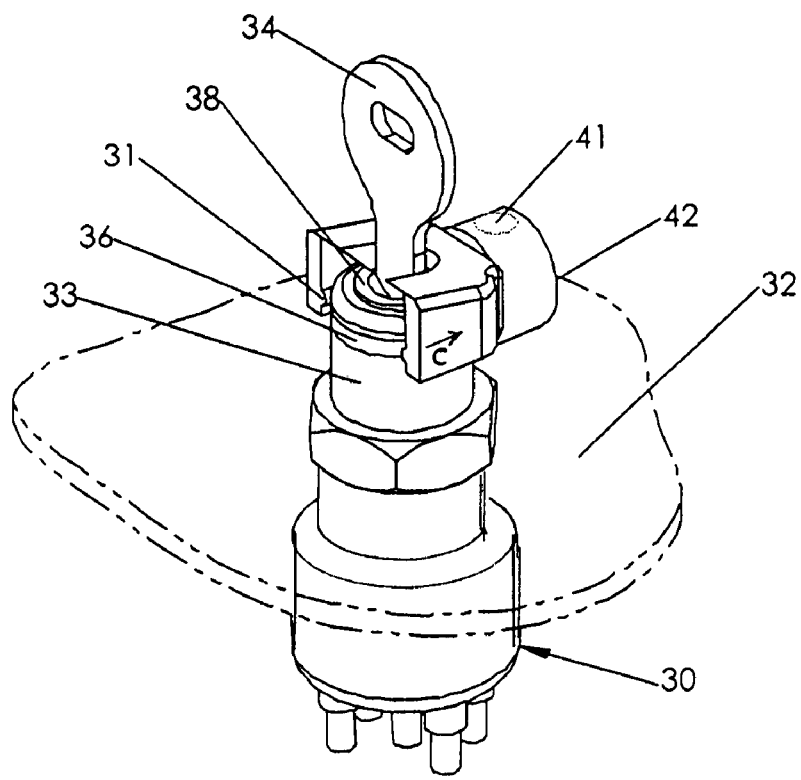
FIG. 2 is an isometric view showing a kill switch having a turn-key and an attached latch key and a portion of instrument panel in phantom.

FIG. 2 is an isometric view of a common kill switch 30 is shown as it mounts in a boat instrument panel 32, shown in phantom. A latch key 40 (also called a clip or simply a key), preferably made of thermoplastic, is engaged with switch 30 in the same manner as is familiar for lanyard-type latch keys used in the prior art. The means for connection of a lanyard to the kill switch is suggested in FIG. 2 by phantom hole 41. A feature of the invention is that it is suitable for retrofit to water craft having a variety of prior art kill switches. A further feature of the invention is a boat operator can use it in conjunction with an old-style lanyard running to his or her person, so either the lanyard or actuator causes the kill switch to stop the engine.

The internal combustion engine ignition system of a boat having kill switch 30 is turned on and off by rotation of common serrated key 34 inserted into switch 30. By design of the switch, to enable the engine to run it is also necessary that the plunger 38, the center part of the switch, be continuously depressed. To enable that, a boat operator slides latch key 40 into place around the switch, as it is shown in FIG. 2. The latch key has opposing side lips 31 within its interior cavity, which the operator engages with groove 36 of the switch body 33. In doing this, the operator necessarily depresses plunger 38; and, when in place, the top of the latch key keeps it from springing upwardly. When, afterwards, sufficient lateral force and energy is applied to the latch key, as indicated by arrow C in FIG. 2, plunger 38 springs upwardly, shutting off the boat engine. In the invention, that lateral force is provided by the actuator 50.

The upward spring force of the plunger 38 on the latch key causes friction force at the groove. By design, friction force is also created by outward expansion of the opposing sides of the latch key, in the circumferential plane of the groove. The combined frictional forces are intended to keep the latch key in place under light lateral forces, which is especially important in the lanyard type prior art system. In an embodiment of the present invention, the latch key and actuator form an assembly 60 which is supported off the switch, thus also necessitating good frictional engagement. The frictional forces are sufficient to keep the latch key engaged with the switch body in the presence of normal shaking and bumping of a boat. It may take from 5 to 8 pounds of lateral force to pull the latch key away from the switch. But as may be appreciated, that means the actuator needs to apply commensurate force to disengage the latch key. Brute force, in terms of an electric solenoid actuator may be employed, but at the penalty of weight and high electric power demand. Preferably, as described in detail below, energy is stored in the actuator by manual compression of a spring. When a person falls overboard, energizing of a small electric coil in the actuator releases the spring energy, thus providing the sufficient energy and force to pull the latch off the switch.

Figure 3:
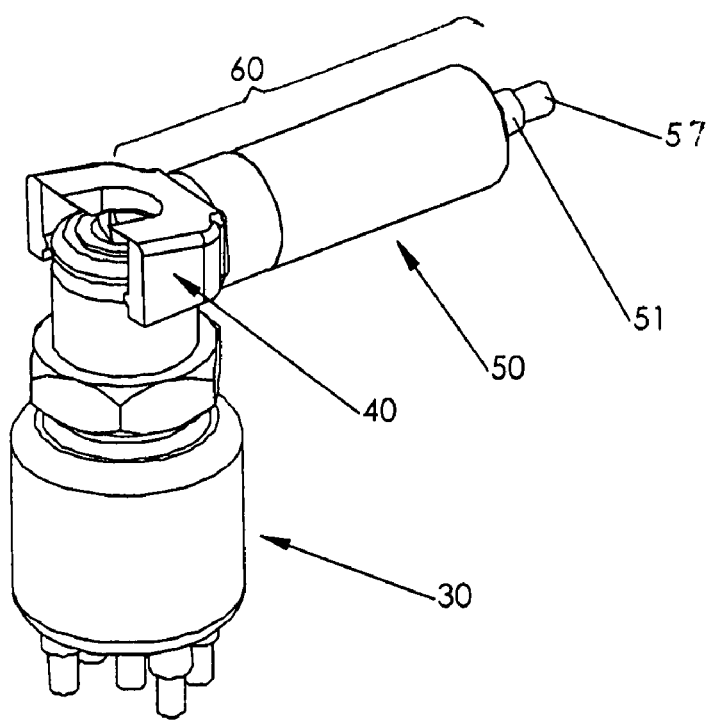
FIG. 3 is a different isometric view of the kill switch of FIG. 2, on which is mounted hold-release assembly (HRA) comprised of a latch key fastened to an actuator.
Figure 4:
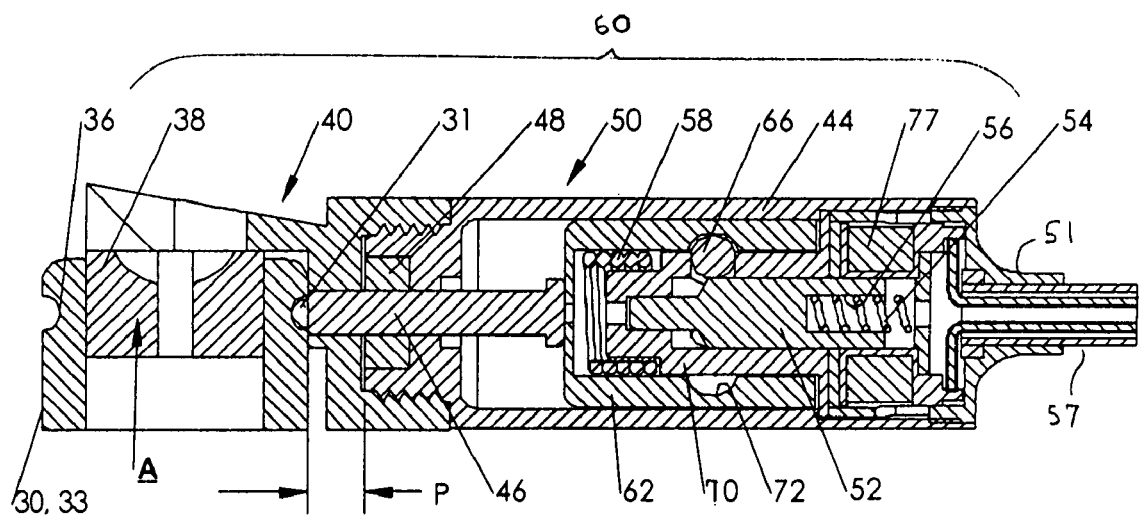
FIG. 4 is a longitudinal plane cross section of the hold-release assembly HRA of FIG. 3, and a portion of the kill switch, showing the actuator in un-energized condition.
Figure 5:
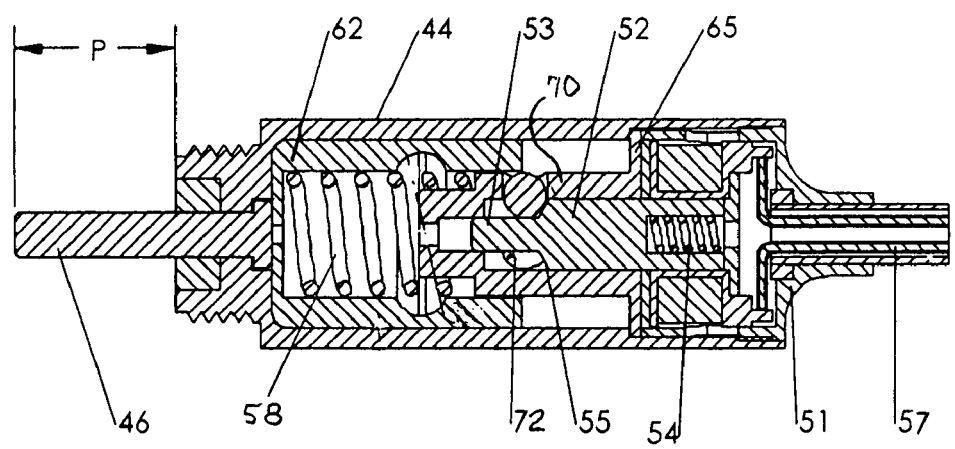
FIG. 5 is a view mostly like FIG. 4, showing the hold-release assembly HRA after the coil has been energized to extend the push rod and discharge the assembly from engagement with the switch. The view also shows and optional end cap which protects wires running to the coil.

In the embodiment of FIG. 3-5, latch key 40 is fastened to actuator 50, preferably by threads as shown, to form an integral Hold-Release Assembly (HRA) 60. When the latch key is engaged with the switch, assembly 60 has holds the switch plunger depressed in place. When the signal received at the receiver at the boat diminishes below a pre-determined threshold, the latch key is pulled off the switch by actuator. A push rod of the actuator pushes against the side of the switch body, and the actuator is forced away from the switch, laterally pulling the attached latch key off the switch. If needed, the HRA can be attached to the instrument panel by a flexible cord to prevent it from falling away as it is disengaged from the switch. The latch key 40 can have different shapes from that illustrated here, as taught by the prior art. For example, some prior art kill switches have a plunger which must be held in raised position. The invention may also be applied to a kill switch which has a rotary, rather than up and down, "kill element" action; and to a kill switch which acts as does a toggle switch.

FIG. 4 is a longitudinal cross section of HRA assembly 60, showing in more detail how it engages kill switch 30. Latch key 40 is threaded onto outer housing 44 which is preferably made of thermoplastic. Other means of fastening, e.g., set screws, may be used. FIG. 4 shows the position of HRA components when sufficient radio signal from the transmitter is being received, i.e., when things are normal and the operator is in the boat. The actuator is said to be in its spring energized condition. In that condition, HRA 60 cantilevers in space from its mounting on the kill switch by means of the latch key engagement; and, plunger 38 is depressed. Arrow A shows the spring bias of the plunger and capability for vertical motion.

FIG. 5 is like FIG. 4 but shows the actuator 50 in its de-energized condition. This is the condition when the signal to the receiver has diminished or ceased, e.g., when someone has fallen overboard. The FIG. 4 view omits switch 30 and adds a desirable end cap 51, which screws onto the outside of housing 44 and protects wires, not shown, which run to the electromagnetic coil 77 at the right end of the actuator. Actuator 50 is connected by wires 57 or other electromagnetic power transmitting means to the receiver-controller.

Referring to both FIG. 4 and FIG. 5, a movable element, namely push rod 46, protrudes from a seal, preferably a lip seal 48, at the end of the actuator which attaches to the latch key. When HRA 60 is mounted on a switch, push rod 46 contacts or is in close proximity to the side of switch. See FIG. 4. When, as a consequence of diminution of radio signal strength received by the receiver-controller assembly 24, the coil 77 becomes energized, thus causing release of stored energy in main spring 58 which makes the push rod 46 move outwardly so that the plunger extension P increases. The extension P is sufficient to cause the latch key to withdraw from engagement with groove 36 of the switch. The whole HRA 60 moves to the right, and will fall away by momentum and gravity from vicinity of the switch. As desired, some restraint like a bracket or line may be used to keep it nearby. When the latch key is removed from the switch, switch plunger 38 moves upwardly, thereby cutting the engine ignition system.

To reinstall HRA 60 on the switch, push rod 46 is manually pressed inwardly to the position shown in FIG. 4. As described below, when that is done and HRA has been de-energized, the push rod stays pressed-in. The latchkey lips 31 are slid back into the groove 36 of switch 30, while the switch center part 38 is manually depressed, as described above. The actuator provides sufficient force to pull the latchkey from the switch, of the order of 5 to 8 pounds force. The actuator has unique construction to provide sufficient energy and force, but at the same time be compact and light, and economic to manufacture. This construction will now be described. Reference is again made to FIGS. 4 and 5.

In the FIG. 4 there is no power to electromagnetic coil 77 and the HRA is mounted on the kill switch. Shuttle 52 lies within the coil 77. It is made of electroplated magnetic steel. Shuttle spring 54 is of the compressive type. It is positioned within cavity 56 at the right end of shuttle 52. Coaxial sleeves 62, 70 circumscribe the shuttle 52. Fixed inner sleeve 70 has three circumferentially-spaced apart radial holes 72, within which are loosely held three latch key balls 66. Shuttle 52 moves lengthwise within the bore of inner sleeve 70. Inner sleeve 70 moves lengthwise within the bore of outer sleeve 62. In use, balls 66 alternately move radially out and in, as described below, to thereby alternately lock and release the sleeves 62, 70 from engagement with each other.

Inner sleeve 70 is made of non-magnetic material, such as Delrin thermoplastic or stainless steel. It is fixed in position by engagement of flange 65 with the bore of Nylon housing 44. Outer sleeve 62 is made of 300 series stainless steel. When outer sleeve 62 moves lengthwise (to the left in the FIG. 4), the closed end of sleeve 62 pushes on stainless steel push rod 46, increasing its extension from the actuator housing. Conversely, when push rod 46 is pressed inwardly, it moves sleeve 62 to the right toward its home position where it stays, provided the actuator and coil are de-energized. Manually pushing the push rod in compresses main spring 58, which is captured between the outer and inner sleeves so it urges them to separate. The drawings show various axial holes along the central axis which allow escape or entry of air, so captured air or vacuum does not impede the linear motions of the parts.

In operation of the actuator, coil 77 is energized as a result of a change in radio signal from the transmitter worn by a person who has fallen overboard or who has otherwise left vicinity of the receiver controller. When the coil is energized, shuttle 52 is magnetically moved into the coil 77 (to the right in the FIG. 4), thus compressing shuttle spring 54 and storing energy therein. The left end of shuttle 52 has a tapered shoulder 55 running to a smaller diameter end 53. The spring force on sleeve 62 is applied to the balls 66, urging them radially inwardly. Thus, when the smaller diameter portion of shuttle 52 moves and presents itself at the transverse plane location of the balls, they do move inwardly. That frees outer sleeve 62 from engagement with inner sleeve 70. That enables outer sleeve 62 to move away from the coil (to the left in FIG. 4). The motion of sleeve 70 causes push rod 46 to extend, and thus HRA 60 is ejected from the kill switch. The disposition of the internal parts of the actuator after these actions have taken place is shown in FIG. 5.

After the push rod has extended, electric power to the coil will be terminated by a control circuit timer in the controller. However, when the power to the coil is terminated, shuttle 52 does not move back to its home position, since it is restrained by balls 66 which are in contact with its shoulder 55. Nonetheless, the operator of the boat will now reset the actuator for another use. The operator manually depresses push rod 46. That compresses main spring 58 while moving outer sleeve 62 to the right, toward the coil. When the motion of sleeve 62 is sufficient, balls 66 will be thrust outwardly due to the force of shuttle spring 54, transmitted at shoulder 55 of the shuttle 52. Then, shuttle 52 moves in the opposite direction, with release of the stored energy in shuttle spring 54. The changed position of the shuttle prevents radially inward motion of the balls, and the outer sleeve 62 is again locked into its home position, characteristic of the de-energized state of the device. In a variation not shown, the push rod may rotate a cam which is in contact with the side of the switch body, for more amplification of mechanical force. Within the scope of the claimed invention, the term spring as used herein is intended to comprehend devices other than those made of spring-steel for storing energy, such as elastomers, gas compression cylinders (gas struts), and spring substitutes, such as linear actuators.

In the generality of the actuator construction and use, manual or mechanical energy of the operator is stored in the device, e.g., in the main spring by depressing the push rod to set the device. Release of that stored mechanical energy is prevented by an internal mechanical latch keying means, e.g., the balls. Electromechanical means, e.g., the coil and movement of the shuttle when the coil is energized (which movement is often referred to as "solenoid action"), releases the actuator internal locking mechanism, to enable release of the stored energy, which extends the push rod and ejects the HRA from the kill switch.

In some commercial kill switches, the movable element is spring biased to cause the plunger to move inwardly, into the switch body; rather than outwardly, when the latch key is removed, to stop an engine. The invention will be useful with such devices by use of a suitable latch key, similar to that used when such devices are operated by means of a lanyard.

Figure 6:
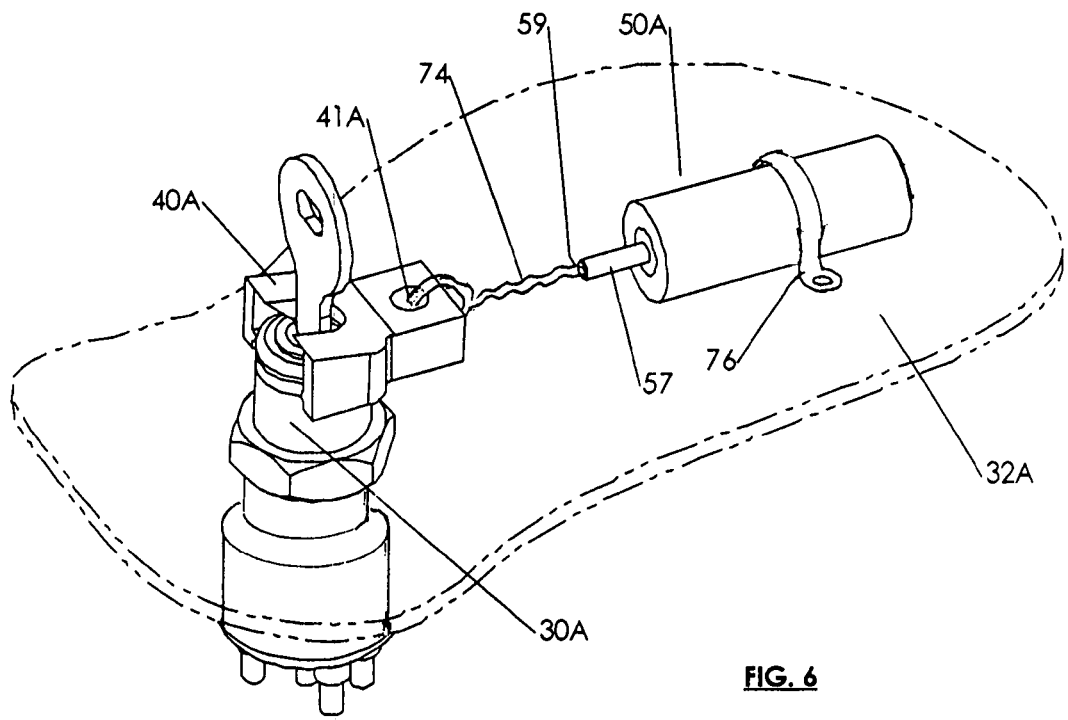
FIG. 6 is an isometric view of a hold-release assembly HRA wherein the spaced apart actuator is connected to the latch key by a tether.
Figure 7:
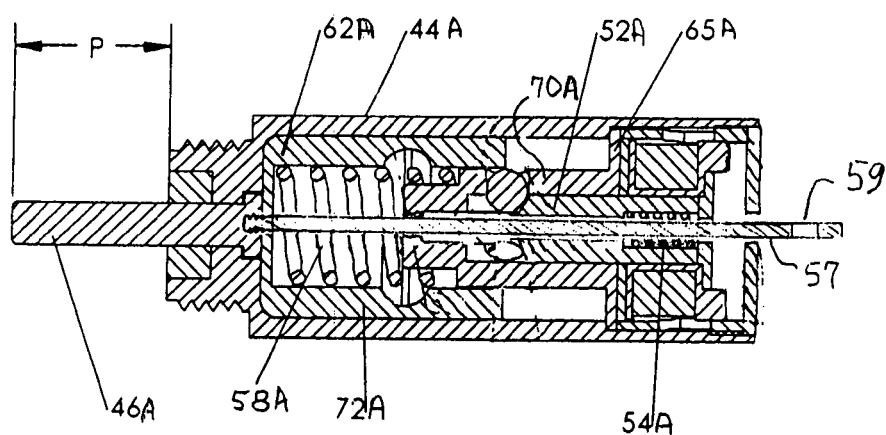
FIG. 7 shows an actuator having a push rod rather than a pull rod.

FIGS. 6 and 7 show an alternate embodiment of the invention in which the rod of the actuator pulls rather than pushes. Parts having numbers with suffixes in these and other Figures correspond with those previously described. The latch key 40A is mounted on the switch 30A as previously described. Actuator 50A is fastened by clamp 76 to the instrument panel or another surface of the boat in vicinity of the kill switch. Tether 74 runs between the pull rod 57 of actuator 50A and latch key 40A. When commanded to act, the actuator pulls on the tether, pulling the latch from the kill switch, to stop the engine FIG. 7 shows one way in which the actuator 50 of FIG. 4 and 5 can be modified to pull rather than push. FIG. 7 is an adaptation of FIG. 5, and shows the actuator when rod 57 has been pulled into the actuator. The power lines running to the coil are omitted. Pull rod 57 screws into the base of shuttle plunger 46A; and it extends through clearance bores in the various components including elements 70A and 52A. Hole 59 enables connection of tether 74 to rod 57. For this and other embodiments, variations in the mechanical construction of the actuator may be employed to achieve the same functional result. Commercially available solenoid type actuators may be utilized, although that could involve more complexity or larger size.

Figure 8:
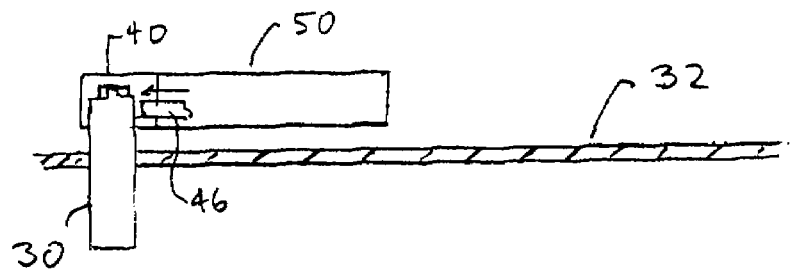
FIG. 8 is a semi-schematic view of essential parts of the invention system, showing a latch key fastened to the actuator, where the assembly is mounted on the switch, in accord with FIG. 3.
Figure 9:
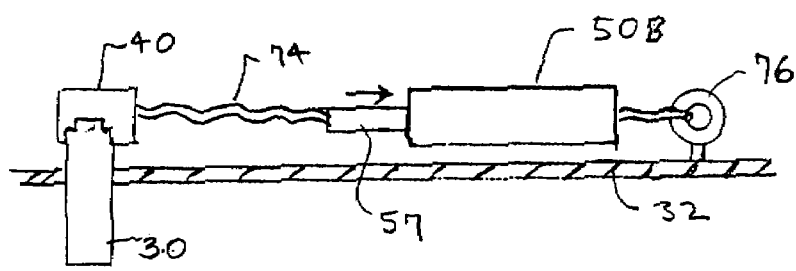
FIG. 9 is similar to FIG. 8, showing an actuator which is tether connected both to the craft and to the latch key which is on the kill switch.
Figure 10:
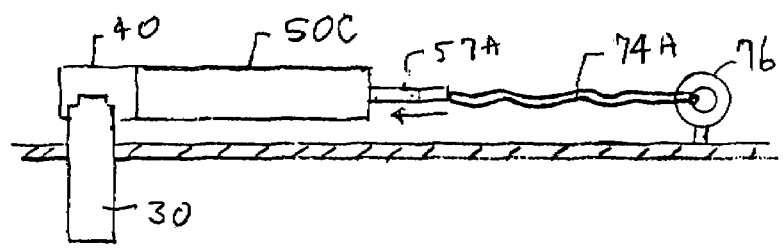
FIG. 10 is similar to FIG. 8, showing a latch key fastened to the actuator which is tether connected to the craft.

FIGS. 8, 9 and 10 semi-schematically show different embodiments of the invention. The motion of the rod of the actuator is indicated by an arrow. FIG. 8 corresponds with the invention described for FIGS. 3, 4 and 5. FIG. 9 corresponds with FIGS. 6 and 7, with the variation that an end of the actuator is connected to a second tether which runs from a ring attachment point 76, rather than having the actuator mounted on the instrument panel 32. FIG. 10 shows another variation, in which the actuator has a rod 57A which, when energized, retracts and pulls on tether 74A that runs to ring 76. The resultant tension force causes the latch key and actuator assembly (40 and 50C) to be pulled from the kill switch.

While an actuator having a rod which moves linearly has been described, other forms of actuators can be used, as are known in the ordinary skill, for obtaining linear motion. For example, the movable element of the actuator can be a reel which draws a tether around it, in winch-like fashion. In another example, the movable element may be a rotatable cam, which pushes the actuator and HRA from engagement with the kill switch.

Figure 11:
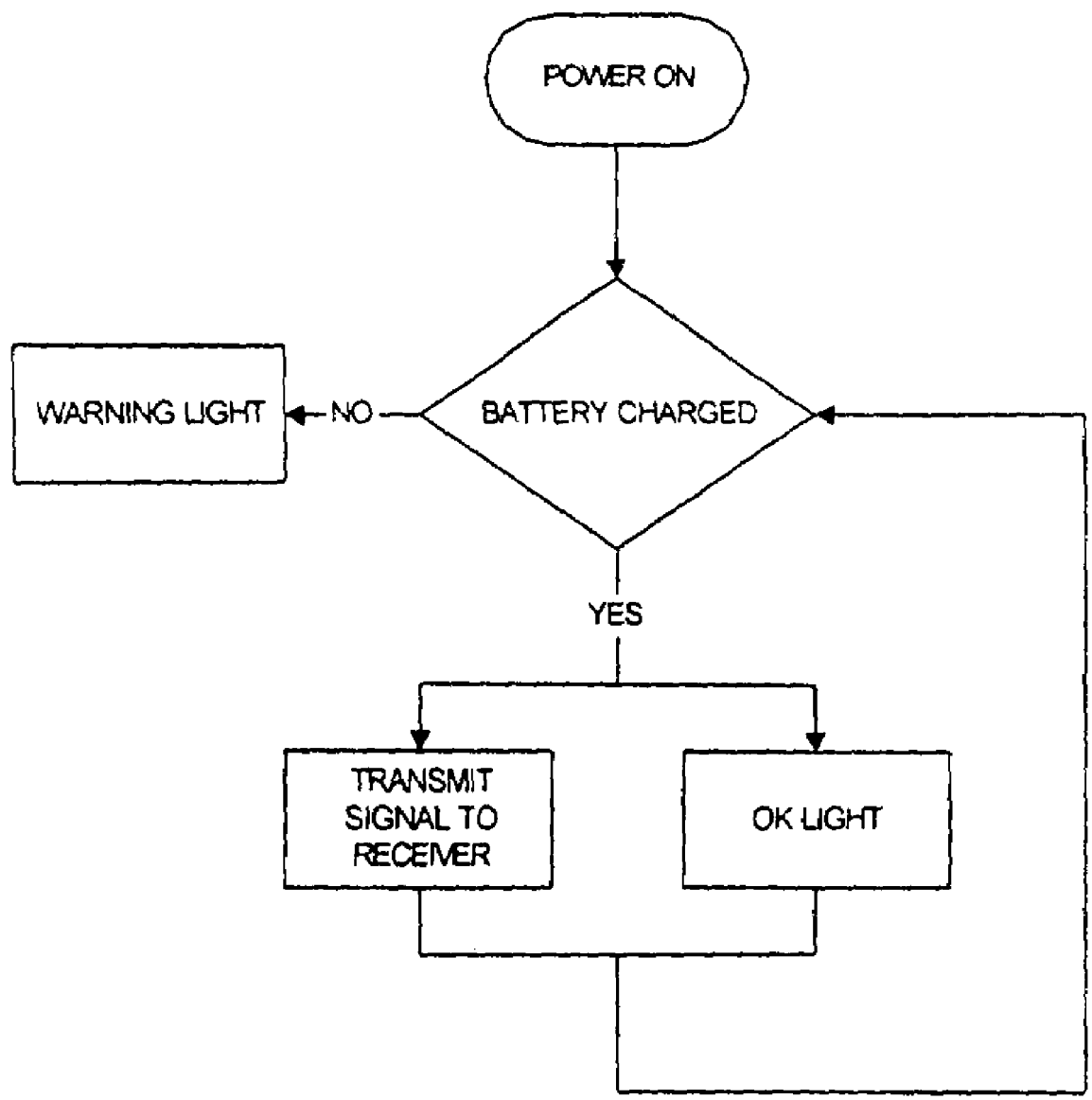
FIG. 11 is a function flow diagram for the receiver-controller and actuator which receives a signal from the transmitter
Figure 12:
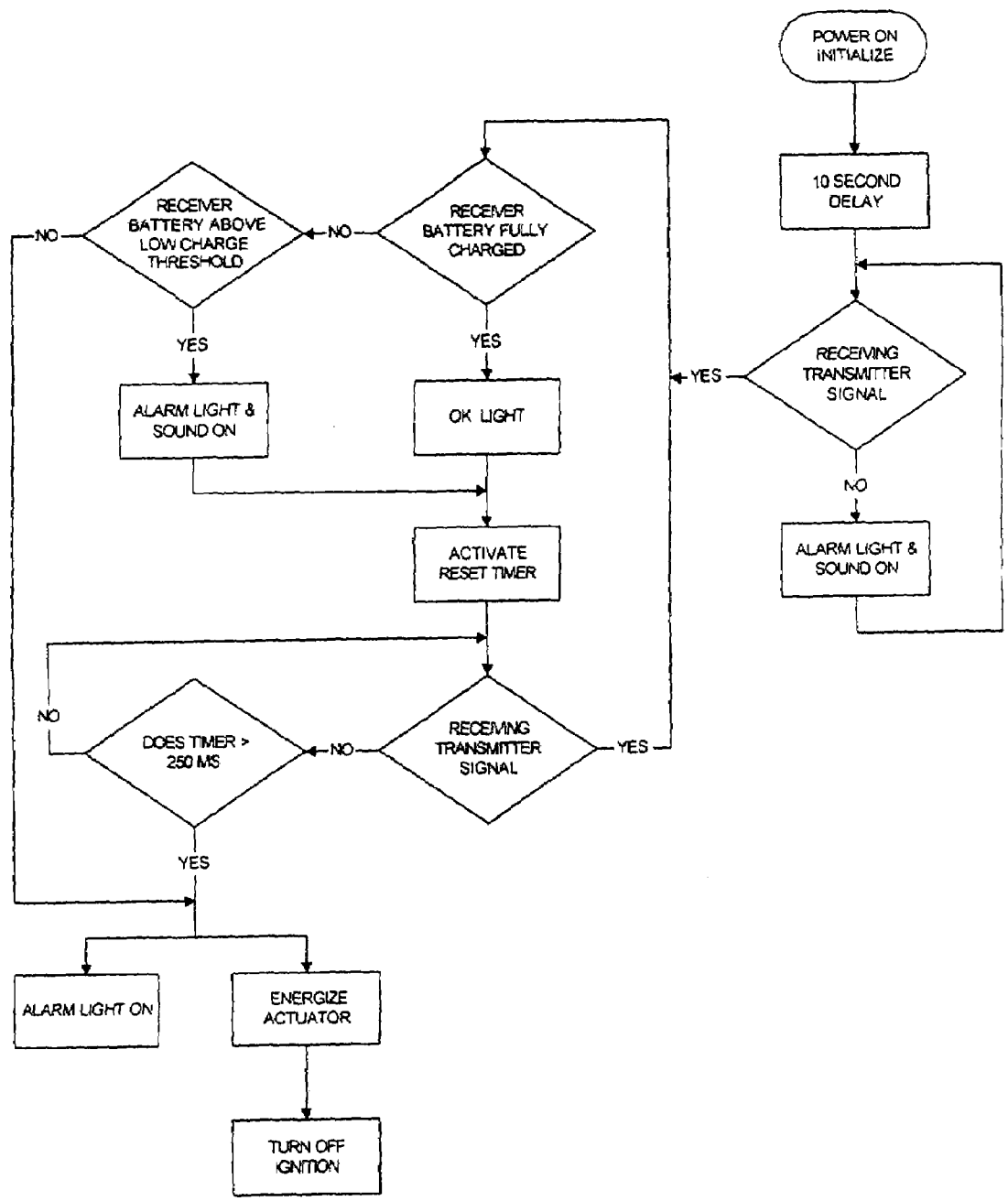
FIG. 12 is a function flow diagram for a transmitter which sends a signal to the receiver.

As mentioned, FIG. 1 shows the overall interconnectedness of the elements of the system of the present invention. FIG. 12 is a function flow chart for the receiver-controller 24 and FIG. 11 is a chart for the transmitter. They are discussed below. The radio transmitter 24, worn by the operator or other boat occupant, and radio receiver-controller 26, mounted on the boat, are preferably comprised of commercially available elements. For example, the transmitter may send signals at 300-400 megahertz. They may be constructed along the lines indicated in patents of the Background.

Generally, the controller commands the actuator to pull the latch key from the switch when the signal from the transmitter received by the receiver diminishes beneath a certain predetermined threshold. That diminution in signal can be due to increased physical separation of the operator from the receiver, or due to immersion in water of the transmitter. The threshold can be fixed, or settable according to the dimensions of the boat or other user-factors. In alternate embodiments, other electromagnetic signaling than those which use radio frequency wavelength may be employed. For instance, ultrasonic or optical sources and sensors may be used.

FIG. 12 shows the functioning of receiver-controller 24, hereafter simply called "receiver." The receiver has conventional components for converting input radio signals to output to the actuator. The unit and any self-contained battery power supply are preferably within a water-tight box, upon the surface of which are mounted switches, visual alarms and other displays which may be desired.

In a first part of its function, the receiver checks to see if a signal from the transmitter is present. If it is not, an alarm is given and the device will not function. If the transmitter signal is present, the system checks the condition of the receiver power supply, i.e., the battery charge or voltage. If it is wholly inadequate, an alarm is given, and the actuator is commanded to pull the latch key from the switch. If the power supply condition is marginal, an alarm is given, but the unit will function. The system persistently checks to see if the requisite transmitter signal is present. If a sufficient signal is not received, there is appropriate re-checking, with use of a timing circuit, to accommodate a momentary inconsequential lapse of signal, or other electrical fluctuation. When a continuing absence of sufficient signal is verified, the receiver causes the actuator coil to be energized by applying power to it. The actuator thus mechanically removes the latch key from the switch, as previously described. The engine ignition system is thus killed. Power flow to the coil and or the receiver may then be terminated by functions which are not shown in the chart. To reset and reinstall the mechanism on the kill switch, the power flow to the coil is ceased, as necessary. The operator mechanically resets the HRA by pushing on its push rod, as described above, and remounts the latch key on the switch. Then the power to the receiver is restored and the unit is ready to function again.

FIG. 11 shows the function of the transmitter 26. If the power supply is insufficient, a warning light is displayed. If power is sufficient, an OK light is displayed and a radio signal is continuously and omni-directionally transmitted.

The technology for sending signals from portable transmitters to a receiver, and detecting and acting on them, is well known in the electric control system arts. We have only described a simple radio transmit-receive system. More sophisticated techniques known in the art may be employed, particularly for reliability or for difficult operating environments.

And other electromagnetic means of sensing the presence of absence of proximity of a person or thing to the controller and craft may be used. While an active continuously-transmitting device is preferably carried by the operator, non-continuously signaling and interrogation type systems may be used. For instance, RFID and ultrasound technology may be used. Radio signals typically diminish when the transmitter becomes submerged, thus enabling quick signaling to the receiver to stop the engine. Radio signals are preferred in practice of the invention, but other wireless communication means, such as optical devices may be substituted. In an alternate less preferable approach, a device which sends a signal when coming into contact with water may be used, when in the normal condition, there is no signal being transmitted.

The system has been described in terms of a single transmitter. Multiple transmitters on multiple people may be used; and, the receiver can be configured to receive their different frequency signals, and to act on a failure to receive any one signal.

Other actuators may be employed in place of the electromechanical HRA which has been described, to withdraw the latch key from the switch. For instance, the actuator may be miniature pneumatic piston cylinder with an associated gas supply such as a compressed carbon dioxide miniature tank. When the requisite transmitter signal is not received, the receiver-controller activates a valve, causing flow of compressed gas into the cylinder, to move a push rod or pull rod, and remove the latch key, in the way described. Such a system is less preferred because of the possibility of gradual gas leakage over an extended period of time.

The invention can be applied to kill switch designs other than that illustrated, by modification within the ordinary skill of artisans. For example, some kill switches comprise a central button which retracts into the body of the switch, when the latch key is withdrawn from the grooves of the button. For example, some switches have a tang which is engaged by a plastic loop; and when the loop is pulled away from the switch, the engine is killed. For instance, a non-magnetic shaft attached to the closed end of outer sleeve 62 could run through a lengthwise hole in shuttle 52, so it extends from the rear end of housing 44. While the actuator is preferably intimately physically attached to the latch key as has been described, in alternate embodiments the actuator may be spaced apart from the latch key and switch, to be connected by a lanyard.

While the invention enables continued manufacture and use of boats with the familiar lanyard type kill switches, the invention may carried out with new kill switches, especially configured for use with a wirelessly commanded actuator. Similarly, the invention may be applied to craft having diesel engines which do not require used of an ignition system, by actuating the means by which the engine is ordinarily stopped, such as by stopping fuel flow to the engine through an electrically controlled valve.

Figure 13:
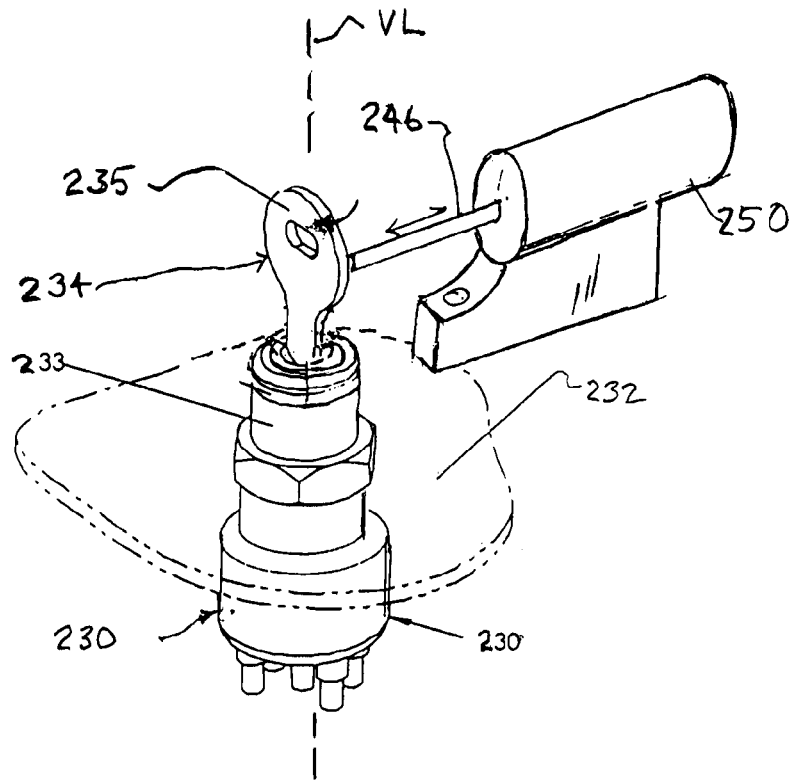
FIG. 13 is a perspective view of an ignition switch as it mounts on a panel, similar to the view in FIG. 2, along with an actuator with a push rod in contact with the grip portion of a key.

FIG. 13-16 show embodiments of the invention in which the ignition switch is rotated by the actuator, when it is part of a system having elements like those described above. FIG. 13 shows an ignition switch 230 which mounts in the instrument panel 232 of a boat, shown in phantom. The numbers for these Figures which have a prefix "2" in most instances, which will be obvious, correspond with previously described elements having the same other digits.

With reference to FIG. 13, is an isometric view showing a key 234 inserted into the opening of the body 233 of switch 230, which is mounted on panel 232, shown in phantom. Switch 230 may or may not have a spring actuated plunger or other element. In the present description, the key 232 has a blade part, not visible, which is contained within the switch, typically to position small internal plungers so that the switch may be rotated. The key has a grip part 235 which extends axially from the body of the switch so that the key may be manually rotated.

The key 34 of switch 230 is manually rotatable from an "off" or "stop" position to an "on" or "run" position, typically through an arc of 90-120 degrees. That is, it has characteristics of common rotatable ignition or power switches. In some types of switches, with continued rotation of the switch beyond "on", may provide a momentary contact "start" position; in others there can be a position between "on" and "off" position, often called the "accessory" position, where devices, but not the engine will operate. In the invention any of these "no-engine-run" positions is equivalent to a stop or off position.

In the embodiment of FIG. 13, actuator 250 is mounted on bracket 102 which is fastened to instrument panel 232 or another fixed part of the boat in proximity to the switch. This is shown only schematically. Actuator 250 has a construction and mode of operation like that described above for actuator 50. When activated, electromechanical and spring forces cause plunger 246 of the actuator to move linearly, to increase its extension. Plunger 246 is positioned so its line of movement is transverse to, and laterally offset from, the vertical axis VL of key rotation. Plunger 246 is in contact with the outer edge of the grip part 235 of key 234. Thus, when the plunger moves responsive to a signal from the transmitter, the plunger pushes on the outer edge of the key, causing the key to rotate in a pre-determined direction, sufficient in degree to rotate the key from "run" to a "non-run", i.e., most likely to "off", position; and, in any case to a point where the engine stops running and the powered motion of the boat decays.

Figure 14:
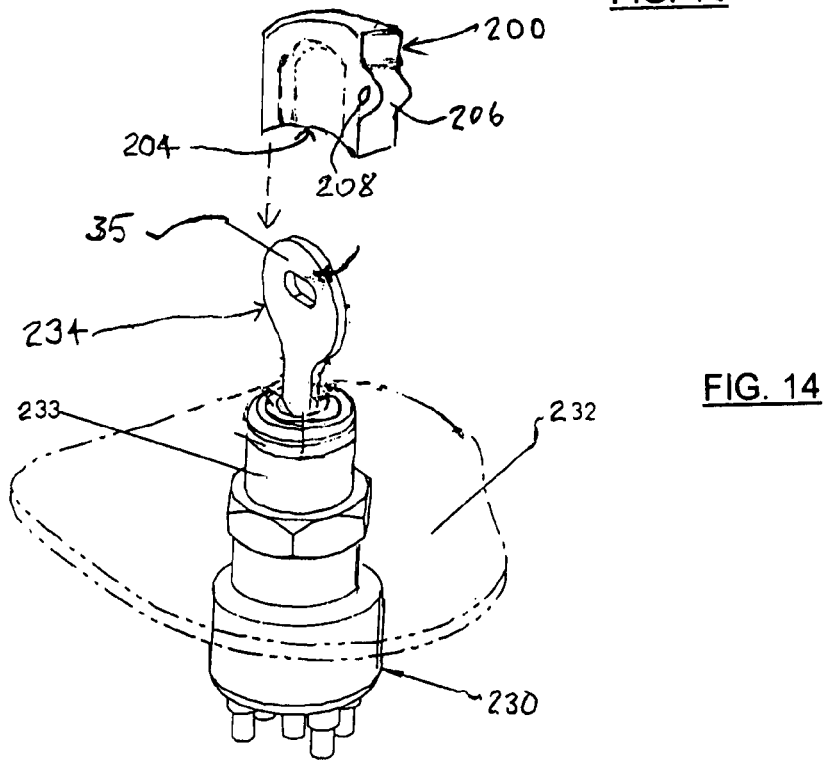
FIG. 14 is a view like FIG. 13, showing in exploded fashion how a cap may encase part of the grip portion, to provide an attachment for an actuator to rotate the switch.
Figure 15:
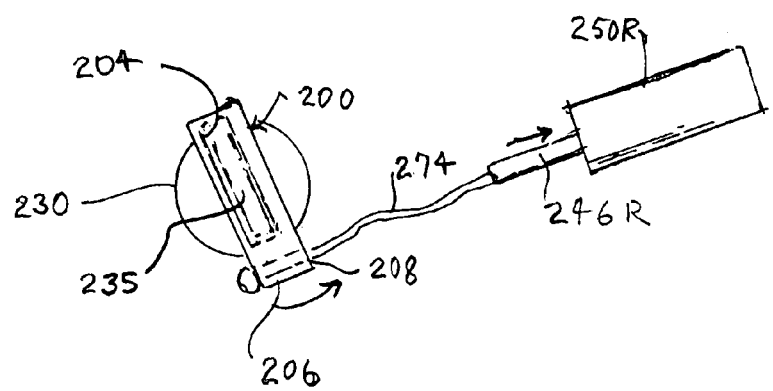
FIG. 15 is a top view of the switch of FIG. 14, showing a cap in place on the grip portion of the key and an actuator tether-connected to the cap.

FIG. 14 is a view like FIG. 13, without the actuator, showing in exploded view how cap 200 is received on the grip part 235 of the key 232, to envelop part or all of the grip. FIG. 15 is a top view of a switch showing a cap 200 engaged with the grip portion of the key. In FIG. 15, the actuator is tether-connected to pull on the switch. Cap 200 which may be made of plastic, has a cavity or pocket 204 into which the exposed grip part of the key fits. The cap has a laterally extending boss or nub 206, optionally having a hole 208. The plunger 246 of an actuator may thus be connected to the key by means of engaging a feature on the cap, e.g., the nub 206. The cap can in other ways be shaped for good connection with the plunger.

In FIG. 15, the cap is connected to the actuator by tether 174 which runs from hole 108 to plunger 46. The plunger in this instance retracts when the actuator acts. Of course, a tether connection to an actuator may be used without use of the cap. For instance, a small cable clamp may be used at an the edge of the grip portion of the key, where it is laterally offset from the key axis VL.

In other embodiments, the cap may be laterally much larger than illustrated, and the nub may extend a greater distance of the center of rotation of the key than shown, so the cap may afford greater mechanical advantage than is offered by the plain key. It will be appreciated that in various of the embodiments, the key may be manually operated in the normal mode, to control the engine, when the invention apparatus is in place. And, when desired, the key can easily removed from the switch owing to the easily disengagement of the elements.

Other kinds of linear and non-linear actuators may be used. For instance, alternative use may be made of a solenoid device, a linear motor, an Acme screw and nut, a fluid cylinder, or a winch or capstan, all or which are commercially available devices, or use may be made of a combustion supported linear force device as described in U.S. Pat. No. 4,211, 352 to Zilka.

Figure 16:
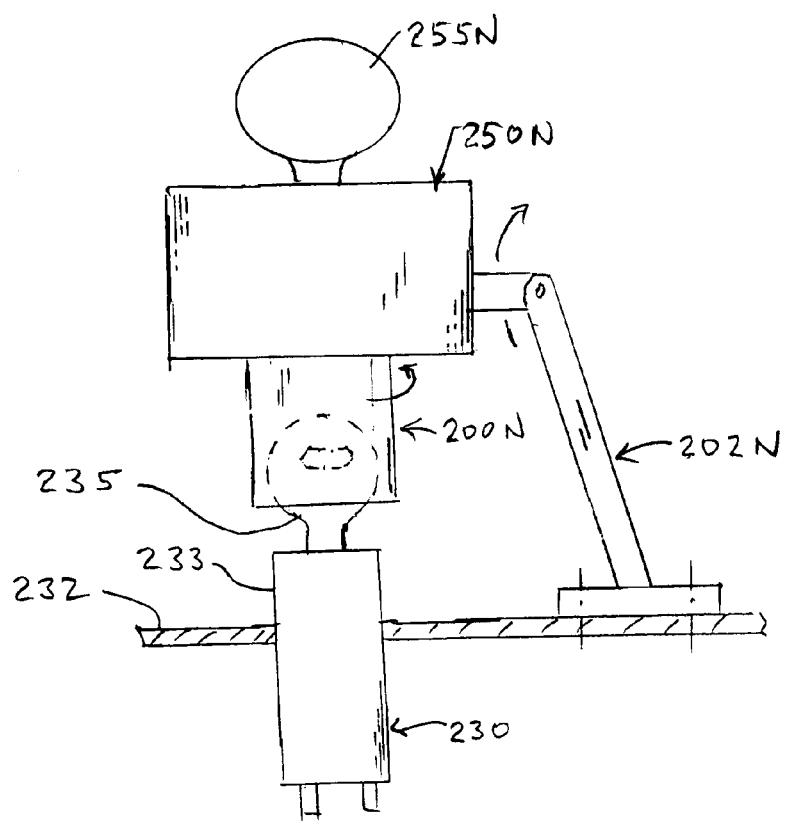
FIG. 16 is a side elevation view of a ignition switch in a panel, in combination with a rotary actuator which is mounted co-axially with the axis of rotation of the switch.

FIG. 16 shows still another embodiment, largely semi-schematically, where the actuator is a rotary actuator rather than a linear actuator. Such types of actuators are well known and may include stepping motors, fluid powered devices, worm gear motor drives, and the like. FIG. 16 is a side elevation view of a rotary ignition switch 230 showing how a rotary actuator 250N is mounted above the switch by means of adjustable bracket 202N. The rotatable output shaft of the actuator has attached to it a cap 200N which receives and grips the key grip part 235. The actuator axis of rotation is aligned with the axis of rotation of the key in the switch. Optional tab 255N projects from the top of the actuator 250N to enable an operator to turn the actuator and thereby the key manually without removing the actuator.

The invention offers advantages previously sought by other inventors, where separation of a transmitter and receiver causes the killing of the engine. Moreover, the invention enables a boat which is in the field, or in a factory, to be fitted with a safety system without intervention into the electric system or use of any skilled electrical craft skills.

Although this invention has been shown and described with respect to one or more preferred embodiments, and by examples, those should not be considered as limiting the claims, since it will be understood by those skilled in this art that various changes in form and detail thereof may be made without departing from the spirit and scope of the claimed invention.

We claim:

1. Apparatus for controlling the operation of an engine of a vehicle when a person falls off the vehicle, of the type having a rotary type ignition switch that may be manually rotated between at least a run and a stop position by means of a removable key having a grip portion that projects from a body of the ignition switch, comprising:

means for wirelessly sending a signal from a person on the vehicle to a receiver on the vehicle;

a receiver, mounted on the vehicle, for receiving a wireless signal;

means for engaging and rotating the grip portion of said key, sufficient to turn the engine off, responsive to a predetermined change in the strength of said wireless signal at the receiver; and, controller means for electromagnetically communicating information between the receiver and the means for engaging and rotating.

2. The apparatus of claim 1 wherein said means for rotating the grip portion key comprises an actuator mounted in proximity to the switch, said actuator comprising: a linear motion plunger, for contacting said grip portion or a device mechanically connected thereto; wherein the line of motion of said plunger is offset from the line of said axis.

3. The apparatus of claim 2 wherein the plunger is engaged with said grip portion by pushing or pulling directly on the grip portion.

4. The apparatus of claim 3 further comprising: a cap mounted on said grip portion; wherein the plunger is engaged with said grip portion by pushing or pulling on the cap.

5. The apparatus of claim 1 wherein the means for engaging and rotating further comprises: a tether, connected at one end to said grip portion and connected at the opposing end to said means for rotating.

6. The apparatus of claim 5, wherein the means for engaging and rotating further comprises: a cap mounted on said grip portion; and, a tether, connected at one end to said grip portion and connected at the opposing end to said cap.

7. The apparatus of claim 1 where said means for engaging and rotating comprises a rotary actuator.

8. The apparatus of claim 7 wherein the rotational axis of said rotary actuator is co-aligned with the axis of rotation of said key.

9. The apparatus of claim 1 wherein said means for engaging and rotating comprises a linear actuator.

10. The apparatus of claim 1 wherein said means for engaging and rotating comprises a linear actuator, wherein a linear moving plunger thereof is connected to said grip portion.

11. The apparatus of claim 1 wherein the means for engaging and rotating comprises an actuator which stores manually input energy in spring means and wherein release of said stored energy causes rotation of said grip portion.

12. The apparatus of claim 1 wherein said means for wirelessly sending a signal from a person on the vehicle to a receiver on the vehicle comprises a first transmitter carried by the person.

13. The apparatus of claim 12 further comprising at least one second transmitter, wherein the first transmitter sends a first characteristic wireless signal to the receiver; wherein the at least one second transmitter sends a second characteristic wireless signal to the receiver; and, wherein the receiver sends a signal to the controller responsive to a predetermined change in either wireless signal.

14. The apparatus of claim 3 wherein the means for engaging and rotating comprises: an actuator having a spring means, for storing manually input energy which powers the movement of said plunger.

15. The apparatus of claim 1 wherein said rotary ignition switch is further of the kill switch type.

16. A method for controlling the operation of an engine of a vehicle when a person falls off the vehicle, of the type having a rotary type ignition switch that may be manually rotated about an axis of rotation, between at least a run and a stop position, by means of a removable key having a grip portion that projects from a body of the ignition switch, comprising:
wirelessly sending a signal from a transmitter carried by the person to a receiver on the vehicle;
mechanically rotating said removable key from a run position to a stop position responsive to a predetermined change in the strength of signal at the receiver by means of an actuator which is engaged with the grip portion of the key.

17. The method of claim 16 wherein the grip portion of said key is rotated by a rotary actuator mounted along said axis of rotation.

18. The method of claim 16 wherein the grip portion of said key is pushed or pulled by a linear actuator having a line of motion which is transverse to and offset from said axis of rotation.

* * * * *